United States Patent [19]

Wheatley

[11] Patent Number: 5,655,808
[45] Date of Patent: Aug. 12, 1997

[54] CLAMP FOR ATTACHING A RAIL TO A PICK-UP BOX

[76] Inventor: Donald G. Wheatley, 4451 Ford Rd., Ann Arbor, Mich. 48105

[21] Appl. No.: 654,681

[22] Filed: May 29, 1996

[51] Int. Cl.$^6$ ............................................. B60P 7/04
[52] U.S. Cl. .................... 296/100; 248/316.6; 248/227.1
[58] Field of Search ............................ 296/100, 164; 248/228.1, 231.4, 231.6, 316.6; 24/525

[56] References Cited

U.S. PATENT DOCUMENTS

| | | | |
|---|---|---|---|
| 5,121,960 | 6/1992 | Wheatley | 296/100 |
| 5,131,780 | 7/1992 | Love | 24/525 X |
| 5,261,719 | 11/1993 | Tucker | 296/100 |
| 5,275,458 | 1/1994 | Barben et al. | 296/100 |
| 5,301,913 | 4/1994 | Wheatley | 248/228.1 |
| 5,310,238 | 5/1994 | Wheatley | 296/100 |

*Primary Examiner*—Dennis H. Pedder
*Attorney, Agent, or Firm*—Harness, Dickey & Pierce, P.L.C.

[57] ABSTRACT

A rail and attaching member for mounting the rail to a cargo box side wall in which the rail is formed with an upwardly open channel along its inboard side. An attaching member has a downwardly open hook which enables the attaching member to be hung onto the rail by seating the hook into the rail channel. This enables the attaching member to be installed on the rail after the assembled rectangular frame is placed on the cargo box. There is no need to tilt the rail or the attaching member to mount the attaching member on the rail, thus avoiding undesired contact of the attaching member with the cargo box walls.

11 Claims, 2 Drawing Sheets

CLAMP FOR ATTACHING A RAIL TO A PICK-UP BOX

BACKGROUND AND SUMMARY OF THE INVENTION

The present invention relates to an apparatus for attaching an accessory, such as a rail, to the side wall of a pick-up truck cargo box. In particular, the invention relates to an improved arrangement for attaching a clamp to a rail for the purpose of mounting the rail to a pick-up box side wall.

A tonneau cover is mounted over the cargo box of pick-up trucks to protect the cargo box and its contents. Tonneau covers are typically mounted to the cargo box by first mounting rails to the top of the cargo box. The rails include features for attaching the tonneau cover to the rails in such a manner that the rails are substantially covered by the tonneau cover, leaving the truck and tonneau cover with a neat appearance.

In a typical tonneau cover arrangement, the rails are attached to one another, forming a rectangular frame overlying the top of the cargo box side walls, tailgate and front wall. The two rails upon the side walls are attached to the cargo box side walls to mount the entire frame to the cargo box. The preferred manner of attaching the rails to the cargo box side walls is with clamps. This avoids the necessity of drilling any holes in the cargo box sheet metal. Holes drilled in the sheet metal provide an opportunity for rust to form and also permanently mar the appearance of the pick-up truck.

Depending upon the length of a cargo box, three to five clamps are used to mount the rails to each side wall. One clamp arrangement for attaching a tonneau cover rail is shown in U.S. Pat. No. 5,121,960, issued to Applicant of the present invention and hereby incorporated by reference. The rail, as shown in FIG. 11 of the '960 patent, has a lower base wall, an upper top wall and a vertical web which extends between the base wall and the top wall, approximately midway between the inboard and outboard edges of the rail. Along the inboard edge of the rail, the top wall, base wall and web form a generally C-shaped clamp slot. This slot receives the head of one of two clamp members that form each clamp. The clamp member has three lips which are seated into the C-shaped slot of the rail to apply the desired forces to the rail when the clamp member is clamped to the cargo box side wall.

While the clamp arrangement shown in the '960 patent properly performs in clamping the rail to the cargo box, assembly of the clamp to the rail can be difficult. Because of the nature in which the clamp member is inserted into the rail slot, the rail and clamp member must be rotated relative to one another to insert the clamp member into the rail slot. If the clamp members are attached to the rails before the frame is placed on the cargo box, it is necessary to hold each of the clamp members in a vertical position while lowering the frame onto the cargo box to avoid scratching of the pick-up truck. This requires many hands, making it difficult to install the tonneau cover. As an alternative, the rectangular frame can be placed on the cargo box and then each side rail lifted to provide the necessary clearance to rotate the clamp members onto the frame side rails. Again, several hands are required to hold the clamp members vertical while the rail is lowered onto the cargo box. A third option is to separately place the frame rails onto the cargo box, clamp the side rails onto the side walls and then attach the front and rear frame rails to the side rails. This is also difficult to do with the side rails already attached to the cargo box.

Another tonneau cover configuration provides a clamp member with an enlarged head which completely fills the slot in the rail. This is shown in U.S. Pat. No. 5,275,458, also incorporated by reference. While this configuration avoids the rotation of the clamp members when they hang from the rail, it requires the clamp members to be slid onto the rails from the rail ends prior to assembly of the rectangular frame. Depending upon the manufacturing tolerances, sliding of the clamp members through the rail slot can be difficult.

Accordingly, it is the object of the present invention to provide an improved clamp and rail structure which enables the clamp or attaching members to be attached to the rail and remain generally in their installed vertical orientation so that the rectangular frame can be placed on the cargo box and the attaching members later mounted to the rail without lifting the rail to provide needed clearance. It is a further object to provide a clamp and rail structure that enables the clamp members to be placed anywhere on the rail without first sliding the clamp members from one end of the rail.

The present invention achieves the above objective by providing the rail with one or more upwardly open channels. The clamp or attaching member mounted on the rail is provided with one or more downwardly open hooks which are placed into the channels of the rail. The attaching member hooks are sized to fit relatively snugly within the rail channels to prevent rotation of the attaching member relative to the rail. Thus, the attaching members are held in their normal installed vertical orientation relative to the rail. There is no need to hold the attaching members in place while lowering the rail onto the box. Furthermore, the attaching members can be easily "hung" onto the rail wherever desired without sliding the attaching members in a rail slot from one end of the rail.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
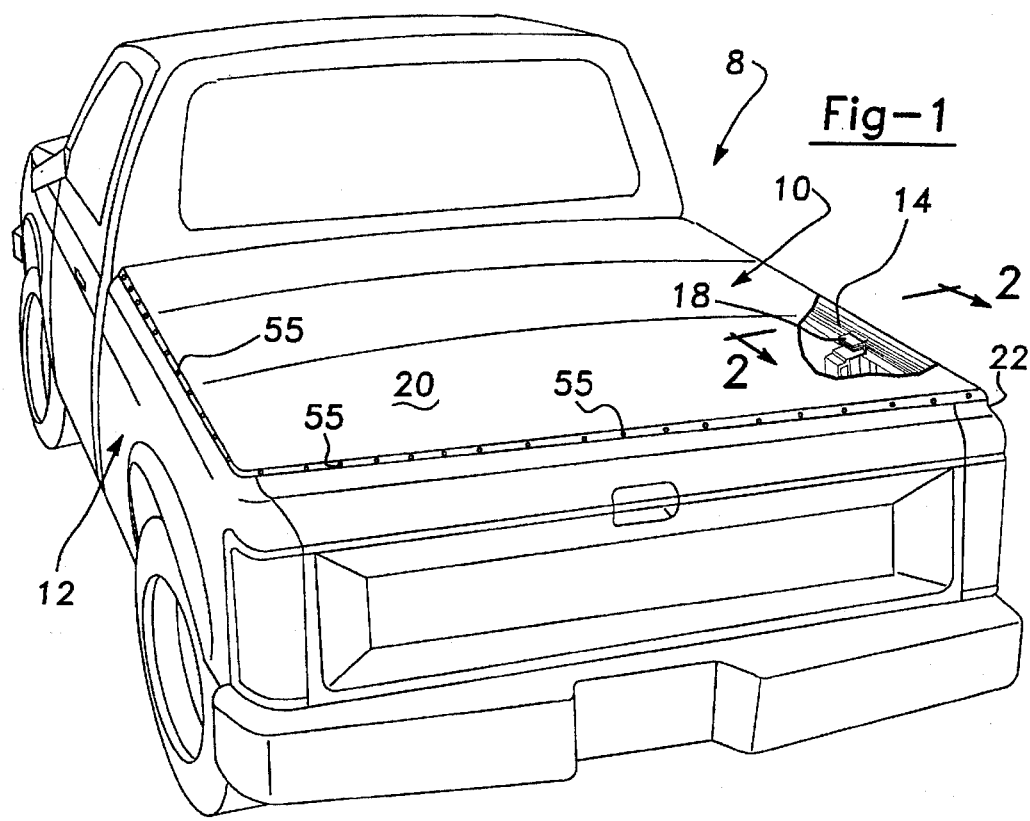
FIG. 1 is a perspective view of a pick-up truck having a tonneau cover attached to the cargo box using the clamp of the present invention.

With reference to FIG. 1, a pick-up truck 8 is shown having a tonneau cover 10 mounted upon the cargo box 12 with clamps according to the present invention. The tonneau cover 10 includes a frame 16, only a portion of which is visible. The frame includes a frame rail 14 upon the top of the cargo box side wall 22. The frame rail 14 is attached to the cargo box sidewall by a plurality of clamps 18. A flexible cover 20 is attached to the frame 16 to cover the cargo box.

The side wall 22 of the cargo box 12 has a top wall 24 upon which the frame rail 14 is disposed. The top wall 24 has an upper surface 26 and a lower surface 27. At the inner edge of the top wall 24, a downturned flange 30 is formed which extends downwardly into the cargo box. The downturned flange has an inboard surface 32 which faces in the inboard direction relative to the cargo box, and an outboard surface 34 which faces in an outboard direction.

The rail 14 is a hollow elongated member, typically extruded of aluminum although other materials and methods of manufacture can be used as well. The rail 14 has a closed sectional shape. The rail 14 includes a bottom wall 36 which, in the embodiment shown in FIG. 2, includes a riser 38. The rail 14 also includes a top wall 40. From the top wall, an outboard wall 42 slopes downwardly and outwardly toward the bottom wall 36. The outboard wall 42 is formed with a snap mounting platform 43 that slopes downward and outward. The platform 43 has an upper overhang 44 and a lower overhang 45. The upper and lower overhangs are portions of the platform 43 that extend beyond connectors 47, 48. The connectors are used to connect the snap mounting platform to the outboard wall 42.

C-shaped clips 51 (only one of which is shown) fit over the platform 43 and are retained by the overhangs 44, 45. The clips can slide along the length of the rail 14. The clips 51 each carry a snap fastener male portion 53. Complementary snap fastener female portions 55 are attached to the flexible cover 20. The cover 20 is held onto the frame rails by coupling of the male and female snap portions to one another.

The rail 14 is formed adjacent its inner edge with an inner vertical wall 46. The vertical wall 46 has vertically spaced upper and lower mounting ledges 48, 50 that extend inwardly from the vertical wall 46. The upper and lower ledges 48, 50 terminate at their inboard ends with upward extending lips 52, 54, respectively. The upper and lower ledges and lips thus form upper and lower channels 56, 58 which are open from above.

The upper and lower channels 56, 58 are used to attach the rail 14 onto the cargo box side wall. The clamps 28 are two-piece clamps having a first clamp or attaching member 60 and a second clamp or attaching member 62. The two attaching members are held together by a bolt 64 and combine with one another to clamp the rail 14 to the cargo box side wall 22.

Attaching member 60 has a pair of hooks, an upper hook 66 and a lower hook 68. Each of these hooks forms a downwardly open bight for placement of the hooks into the channels 56, 58 of the rail 14. The attaching member 60 extends inwardly from the hooks 66, 68 with a wall 70. The attaching member 60 then extends downwardly, adjacent the downturned flange 30 forming a pair of spaced legs 72, 74 which form a pocket 76 therebetween. The pocket 76 is closed at its upper end by a base 78. The base 78 is formed with an aperture 80 through which the bolt 64 extends.

The second attaching member 62 is generally U-shaped having a pair of spaced legs 82, 84. The leg 82 is received in the pocket 76 and has a threaded bore 86, or carries a threaded nut, that receives the bolt 64. By tightening the bolt 64, the leg 82 of attaching member 62 is drawn into and held in the pocket 76. The leg 82 includes a protrusion 88 at its distal end which engages the leg 74 of the first attaching member 60. The leg 72 of the attaching member 60 has a protrusion 90 at its distal end which engages the opposite side of the leg 82 of the attaching member 62.

The end 92 of the leg 84 of the attaching member 62 carries a pair of rubber or plastic beads 94 which engage the lower surface 27 of the cargo box top wall 24. When the bolt 64 is tightened, the clamp 28 draws the rail 14 down against the upper surface of the top wall 24 while the beads at the end of the leg 84 engage the lower surface 27 of the top wall. The rail 14 is thus clamped to the cargo box side wall. The verb "clamp" is used throughout the specification and claims to mean the pressing of a portion of the cargo box side wall between the first and second attaching members or between one clamp member and the rail.

The channels 56, 58 on the rail 14 and the hooks 62, 68 on the attaching member 60 are configured such that with the rail 14 sitting upon the cargo box side wall, the attaching member 60 can be hooked onto the rail at any point along the rail's length while maintaining the legs 72, 74 of the attaching member 60 essentially vertical. As a result, the attaching members 60 can be hung on the rail 14 without tipping the rail 14 to a different angular position or without contacting the cargo box side wall 22 with the attaching members 60. This enables the rectangular frame 16 of a tonneau cover to be completely assembled off the truck, then moved to the top of the cargo box walls with the attaching members 60 being subsequently added to the frame. This facilitates the assembly of the frame and the mounting of the frame to the cargo box as compared to prior art designs discussed above in which the attaching member must first be tilted relative to the rail before being inserted into a channel in the rail, or the attaching member must be inserted from one end of the rail and slid along the length of the rail to the desired location.

The attaching member 60 is configured such that when it is clamped to the cargo box, the hook 66 will contact the vertical wall 46 of the rail rather than contacting the upwardly extending lip 52 of the channel. Furthermore, hook 68, will contact the lip 54 rather than the vertical wall 46. This allows the clamp 28 to apply a moment to the rail 14 forcing the rail downward against the top wall of the cargo box side wall. The attaching members 60, 62 are configured relative to one another so as to produce the moment applied to the rail 14.

The attaching member 60 is further provided with a pair of inwardly extending flanges 96, 98 which form a bow receiving pocket 100 therebetween. The pocket 100 is used to attach one end of a cross bow (not shown) that spans across the cargo box to support the cover 20 between the cargo box side walls.

Figure 3:
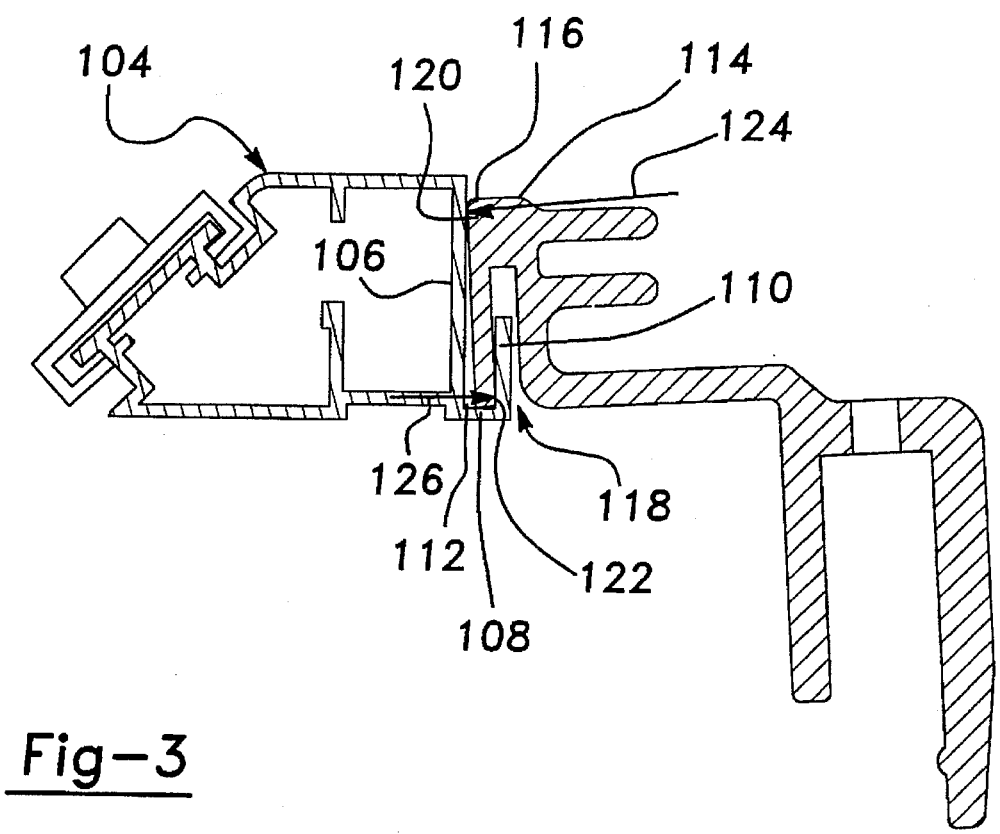
FIG. 3 is a sectional view of an alternative embodiment of the invention.

FIG. 3 illustrates a alternative embodiment of the invention. The rail 104 is similar in structure to the rail 114 and includes a vertical wall 106 along its inner edge. Extending inwardly from the inner wall 106 is a single horizontal ledge 108 having an upwardly extending vertical lip 110. The ledge 108 and 110 form a single channel 112 open from above. The clamp member 114 is formed with a single hook 116 which has a downwardly open bight 118 for receiving the lip 110 on the rail 104 to mount the clamp member 114 onto the rail.

Figure 2:
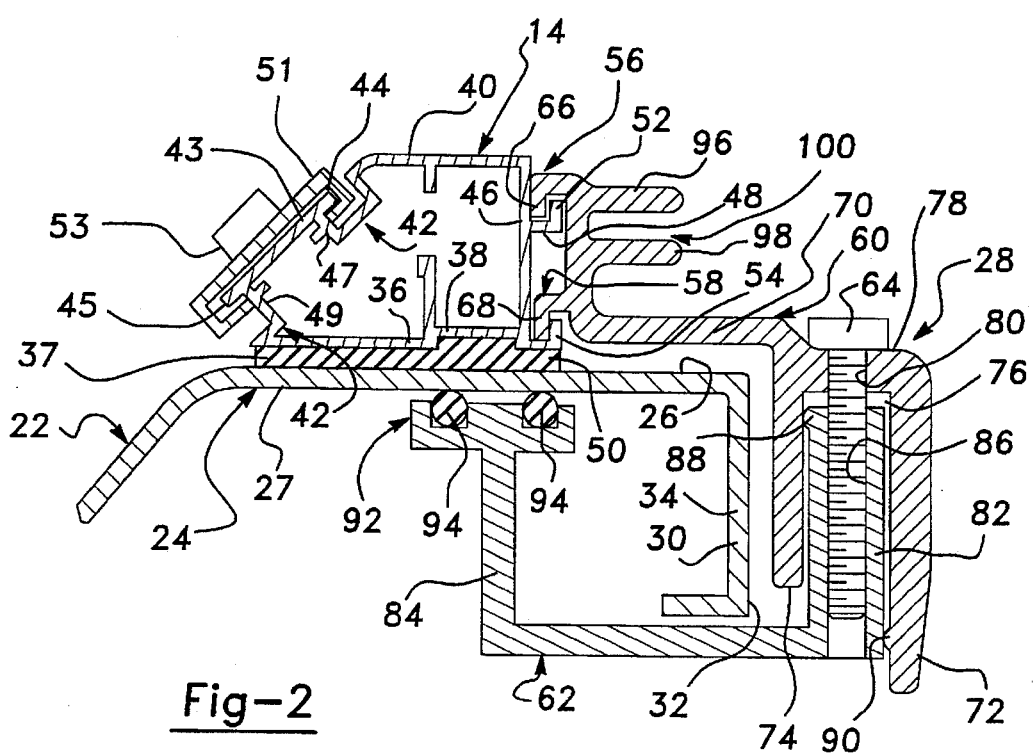
FIG. 2 is sectional view of the tonneau cover frame rail clamped to the upper end of the cargo box side wall as seen from substantially the line 2—2 of FIG. 1.

The rail and clamp member shown in FIG. 3 illustrate a rail attachment utilizing a single hook and single channel as opposed to the dual hooks and dual channels shown in FIG. 2. The clamp of which the clamp member 114 is a part of is configured such that when it is tightened to the pick up box sidewall, the clamp 114 will contact the inner wall 106 near the upper end of the rail shown generally at 120. The distal end of the hook in turn contacts the lip 110 near the lower end of the rail generally at 122. This results in forces applied to the rail as shown by the arrows 124 and 126. These forces produce a moment on the rail 104 forcing the rail downward against the pick up box sidewall. As shown in FIG. 3, the clearance between the channel 112 and the hook 116 is exaggerated to illustrate the points of contact between the channel and the hook.

As described above with respect to the embodiment shown in FIG. 2, the rail can have various means for attaching the flexible cover to the rail. Likewise, various structures can be used for the clamp 114 to attach the clamp and rail to the pick up box sidewall.

The invention relates to the mounting of the first attaching member 60 onto the rail 14. The particular configuration of the first and second attaching members an how they couple to one another is only illustrative of many possible configurations which can be used. For example, in Applicant's U.S. Pat. No. 5,121,960, the attaching members clamp against opposite sides of the downturned flange as opposed to clamping to the top wall of the cargo box side wall. Another clamp configuration is shown in U.S. Pat. No. 5,275,458. Other clamp arrangements are shown in U.S. Pat. No. 4,901,963 and 5,131,780 which could be used as well. While clamping the rails to the cargo box is preferred, it is also possible to bolt the first attaching member to the cargo box once it is hung onto the rail. The above mentioned clamps all utilize two members held together by a threaded fastener. Other means for coupling the two clamp members can be utilized as well, such as a cam and lever arrangement. Likewise, while a snap fastener is shown for attaching the cover 20 to the rail 14, other attachment methods such as an elongated strip fastener can be used as well with a properly configured rail. The attachment of the cover to the rail forms no part of the present invention.

The clamp of the present invention thus facilitates assembly and mounting of a rail to the cargo box by enabling the rail to be placed on top of the cargo box and then attaching the attaching members to the rail without having to tilt the rail or the attaching members relative to their normal installed position. This enables the rail to be mounted to the cargo box without contact between the attaching members and the cargo box and also eliminates any contact between the rail and the cargo box except by the foam rubber pad 37 mounted to the bottom wall 36 of the rail.

It is to be understood that the invention is not limited to the exact construction illustrated and described above, but that various changes and modifications may be made without departing from the spirit and scope of the invention as defined in the following claims.

I claim:

1. An apparatus for attaching an accessory to a vehicle cargo box, the cargo box having a side wall terminating at an upper end with a generally horizontal top wall, said apparatus comprising:

an elongated rail disposed upon the top wall of the cargo box side wall, said rail having a channel along an inboard edge of said rail, said channel being open from above;

a first attaching member for attaching said rail to said cargo box side wall, said attaching member including a mounting hook forming a downwardly open bight for placement of said hook into said channel of said rail upon lowering of said first attaching member onto said rail from above to hang said first attaching member on said rail; and means for affixing said first attaching member to said cargo box side wall when said first attaching member is hung on said rail whereby said rail is attached to the side wall.

2. The apparatus of claim 1 wherein said means for affixing comprises:

a second attaching member adapted to cooperate with said first attaching member in a clamping arrangement to engage opposite surfaces of the side wall between said second attaching member and said rail to clamp said side wall therebetween to attach said rail to the side wall; and means for holding said first and second attaching members together in said clamping arrangement with the side wall.

3. The apparatus of claim 2 wherein said means for holding said first and second attaching members together in said clamping arrangement with the side wall includes a threaded fastener.

4. The apparatus of claim 2 wherein said second attaching member engages a lower surface of said top wall of said cargo box side wall and clamps said top wall of said cargo box side wall between said second attaching member and said rail.

5. The apparatus of claim 1 wherein said rail has a generally vertical inner wall with said channel extending inwardly from said inner wall.

6. The apparatus of claim 1 wherein said rail has two upwardly open channels which are vertically spaced from one another and said first attaching member has two vertically spaced hooks each having a downwardly open bight for hanging said first attaching member to said rail.

7. An apparatus for attaching an accessory to a vehicle cargo box, the cargo box having a side wall terminating at an upper end with a generally horizontal top wall, said apparatus comprising:

an elongated rail disposed upon the top wall of the cargo box side wall, said rail further having an elongated channel open from the above and extending in the length direction of said elongated rail;

clamping means for clamping said rail to said cargo box side wall, said clamping means including first and second attaching members, said first attaching member having a mounting hook forming a bight open downward for placement of said hook into said channel of said rail upon lowering of said first attaching member onto said rail from above to hang said first attaching on said rail; and means for coupling said first and second attaching members to one another in a clamping arrangement with a portion of said cargo box side wall being held between said second attaching member and one of said rail and said first attaching member whereby said rail is attached to the side wall.

8. The apparatus of claim 7 wherein said second attaching member engages a lower surface of the top wall of the cargo box side wall and clamps the top wall of the cargo box side wall between said second attaching member and said rail.

9. The apparatus of claim 7 wherein said means for coupling said first and second attaching members to one another includes a threaded fastener.

10. An apparatus for attaching an accessory to a vehicle cargo box, the cargo box having a side wall terminating at an upper end with a generally horizontal top wall, said apparatus comprising:

an elongated rail disposed upon the top wall of the cargo box side wall, said rail further having vertically spaced upper and lower channels, said channels being open from above and extending in the direction of the length of said elongated rail;

clamping means for clamping said rail to said cargo box side wall, said clamping means including first and second attaching members, said first attaching member having vertically spaced upper and lower mounting hooks each forming a bight open downward for placement of said hooks into said upper and lower channels of said rail respectively to hang said first attaching member on said rail; and means for coupling said first and second attaching members to one another in a clamping arrangement with a portion of said cargo box side wall being held between said second attaching member and one of said rail and said first attaching member.

11. The apparatus of claim 1 wherein interengagement of said rail and said first attaching member limits rotation of said first attaching member relative to said rail whereby said first attaching member hangs from said rail in an installed position prior to being affixed to said cargo box side wall.

* * * * *